(12) United States Patent
Lorenzo et al.

(10) Patent No.: US 8,344,892 B2
(45) Date of Patent: Jan. 1, 2013

(54) PERSONALIZATION OF EVENT PARTICIPATION IN MOBILE NEIGHBORHOODS

(75) Inventors: Arturo M. Lorenzo, Fairport, NY (US); Hua Liu, Fairport, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 632 days.

(21) Appl. No.: 12/556,106

(22) Filed: Sep. 9, 2009

(65) Prior Publication Data

US 2011/0057798 A1    Mar. 10, 2011

(51) Int. Cl.
    *G08G 23/00* (2006.01)
(52) U.S. Cl. ............... 340/573.1; 340/572.1; 340/572.4; 340/539.1; 235/487; 235/492; 705/9
(58) Field of Classification Search ............... 340/572.1, 340/572.4, 573.1, 539.1, 825.69, 825.72, 340/10.42; 235/487, 492, 380, 381; 705/1, 705/3, 9
    See application file for complete search history.

(56) References Cited

U.S. PATENT DOCUMENTS

| | | | | |
|---|---|---|---|---|
| 6,976,032 | B1 * | 12/2005 | Hull et al. | 1/1 |
| 7,347,378 | B2 * | 3/2008 | Frohlich et al. | 235/487 |
| 7,508,308 | B2 | 3/2009 | Chung | |
| 2007/0233548 | A1 * | 10/2007 | Okawa | 705/9 |

OTHER PUBLICATIONS

Rosen, M., Riordan, M. and Cost, F., "Day Keeper Project: Personalized Automated Book Printing for Documenting and Individual's Experience at a Crowded Park, Party of Event", 16 pages, (2008).
Klym, N., Fine, C., Trossen, D. and Tavshikar M., "The Evolution of RFID Networks: The Potential for Disruptive Innovation," 20 pages (2006).

* cited by examiner

*Primary Examiner* — Hung T. Nguyen
(74) *Attorney, Agent, or Firm* — Hoffmann & Baron, LLP

(57) ABSTRACT

Embodiments described herein are directed to personalizing event participation of a visitor at an event. Embodiments include communication nodes that form defined wireless areas. A first one of the communication nodes determines when the visitor enters a first defined wireless area in response to detecting an identifier associated with the personal portable wireless device associated with the visitor, records user activities of the visitor within the first one of defined wireless areas, and determines an interest of the visitor in response to the user activities in the first defined wireless area, where the interest is used to customize the event for the visitor.

17 Claims, 6 Drawing Sheets

PERSONALIZATION OF EVENT PARTICIPATION IN MOBILE NEIGHBORHOODS

BACKGROUND

1. Technical Field

The presently disclosed embodiments are directed to a wireless communication system configured to determine interests of a visitor for personalizing the visitor's experience at an event.

2. Brief Discussion of Related Art

Typically, participants at an event, such as a trade show, show room exhibit, and the like, walk through the event stopping at exhibit booths to learn about attractions, such as electronic devices that perform services, operations, or functions. Some events can include a directory and/or map of the booths and attractions at the event so that the participant can refer to the directory and/or map when determining at which of the booths the participant will stop. These directories and/or maps, however, may not include complete information about the actual services, operations, or functions that can be performed by the attractions. As a result, participants may bypass some booths that have attractions in which the participant is interested and may stop at some booths that have attractions in which the participant is not interested.

Likewise, when a participant stops at a particular exhibit booth, the participant may not know about certain services, operations, or functions that can be performed by the attractions. As a result, the participant may not gain a full appreciation of the attractions and may overpass services that can be performed by the attraction which may be of interest to the participant. The lack of personalization at events can result in an inefficient use of a participant's time and can result in the participant missing attractions that may be of interest to the participant.

SUMMARY

According to aspects illustrated herein, there is provided a method for personalization of event participation. The method includes determining when a visitor enters a first one of a plurality of defined wireless areas in response to a detection of an identifier associated with a personal portable wireless device by a first communication node in the first one of the plurality of defined wireless areas. The portable wireless device is associated with the visitor. The method also includes recording user activities of the visitor within the first one of the plurality of defined wireless areas using the first communication node and determining an interest of the visitor in response to the user activities in the first one of the plurality of defined wireless areas. The interest is used to customize the event for the visitor.

According to other aspects illustrated herein, there is provided a system for personalizing event participation. The system includes communication nodes forming defined wireless areas including at least one attraction. A first one of the communication nodes is configured to determine when a visitor enters a first one of the defined wireless areas, record user activities of the visitor within the first one of the defined wireless areas, and to determine an interest of the visitor in response to the user activities in the first one of the defined wireless areas. The interest is used to customize the event for the visitor.

According to further aspects illustrated herein, there is provided a computer readable medium storing instructions executable by a computing system including at least one computing device, wherein execution of the instructions implements a method that includes determining when a visitor enters a first one of a plurality of defined wireless areas in response to detection of an identifier associated with a personal portable wireless device by a first communication node in the first one of the plurality of defined wireless areas. The portable wireless device is associated with the visitor. The method implemented upon execution of the instructions also includes recording user activities of the visitor within the first one of the plurality of defined wireless areas using the first communication node and determining an interest of the visitor in response to the user activities in the first one of the plurality of defined wireless areas. The interest is used to customize the event for the visitor.

DETAILED DESCRIPTION

Figure 1:
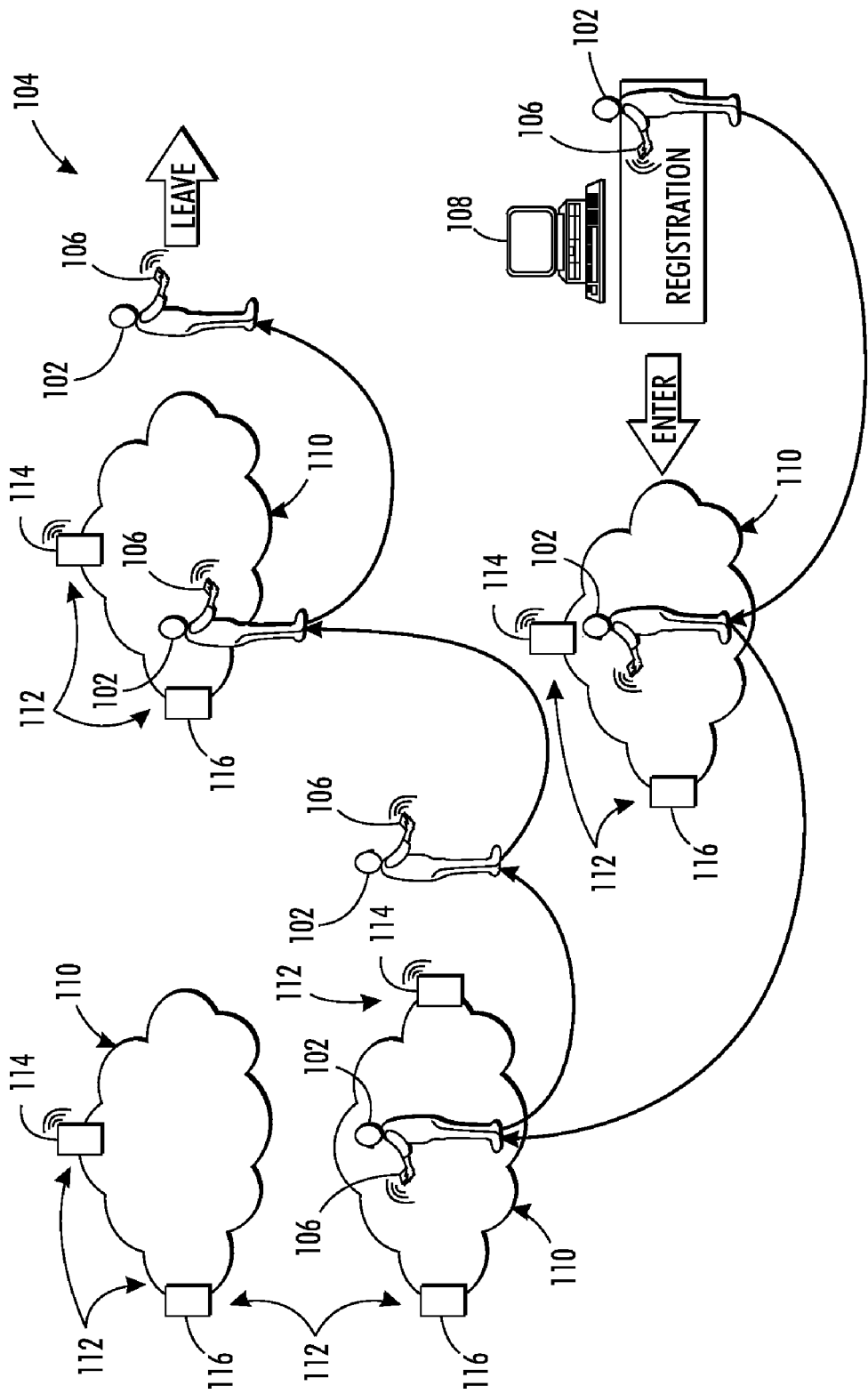
FIG. 1 illustrates an exemplary environment in which a visitor's experience can be personalized.

Exemplary embodiments are directed to personalizing an event for a visitor. For example, exemplary embodiments can promote services that are interesting to the visitor, suggest attractions that may be of interest to the visitor, provide a visitor with more information regarding service in which the visitor is interested, forward the visitor's interests to a representative, who may be in the neighbor and may be knowledgeable of the service in which the visitor is interested, generate a customized brochure document including information directed to the visitor's interests, and the like. To achieve this, exemplary embodiments determine interests of a visitor from the user activities of the visitor within defined wireless areas encompassing one of more attractions.

As used herein, an "event" refers to a designated place where visitors can visit attractions. Some examples of events include a conference, trade show, manufacturer or merchant show room, an amusement park, a store, and the like. Visitors are persons who visit the event. Participation in an event by a visitor refers to the visitor being present at the event.

As used herein, an "interest" refers to something that draws the attention of a visitor, arouses the curiosity of a visitor, and the like, and may indicate personal preferences of a visitor or a group of visitors. Interests can be determined based on "user activities" of a visitor in one or more defined wireless areas at an event, which can refer to an amount of time a visitor remains in the one or more defined wireless areas and user interactions between the visitor and attractions within the one or more defined wireless areas. User interactions occur when a visitor interfaces with an attraction by, for example, interacting with a user interface of the attraction.

As used herein, "customization" and "personalization" refer to making adjustments, modifications, suggestions, and the like, to reflect interests of a visitor or a group of visitors.

As used herein, a "communication node" is a computing device configured for communication, wireless or wired, with electronic devices that are within a wireless area defined by the communication node, referred to herein as a "defined wireless area", as well as with other communication nodes and electronic devices beyond the boundaries of the defined wireless area. The communication node can use one or more wired or wireless technologies for communicating with other electronic devices. Boundaries of the defined wireless area may not be uniformly defined or constant and may vary.

As used herein, "detection" refers to determining when a portable wireless device enters a defined wireless area, "recording" refers to storing information, such as user activities of a visitor in a defined wireless area or images captured by a camera, and "registering" refers to associating a wireless portable device with a visitor.

As used herein, an "identifier" refers to a unique sequence of characters or other glyphs associated with a personal portable wireless device to distinguish the personal portable wireless device from other personal wireless devices.

A "portable wireless device" is a device that can be carried through an event and that is configured to perform wireless communication. Some examples of personal portable wireless devices include a Radio Frequency Identification (RFID) tag, mobile phone, smart phone, personal digital assistant (PDA), tablet PC, and the like, the implementation of which are well known in the art.

As used herein, "controlling" refers to coordinating, modifying, manipulating, and the like, attractions to reflect interests of a visitor and customize the event for visitors.

As used herein, an "attraction" refers to a something at an event provided to attract visitors, and can include, for example, commercial electronic devices, consumer electronics, and the like. Some examples of electronic devices include Multifunction Devices (MFDs), fax machines, scanners, copiers, printers, print finishers, televisions, computing devices, and so on.

As used herein, "promote" refers to recommending or suggesting attractions and/or services to a visitor.

As used herein, a "service" refers to a function, operation, act, and the like, that can be performed by attractions. Some examples of services include printing, scanning, faxing, copying, storing, print finishing, and the like, although those skilled in the art will recognize that services will vary depending on the type of attraction offering the services. Service for printing and copying can use an "electrostatographic process", which refers to forming and using electrostatic charged patterns to record and reproduce information, a "xerographic process", which refers to the use of a resinous powder on an electrically charged plate record and reproduce information, or other suitable processes, such as an ink jet process, a liquid ink process, a solid ink process, and the like.

As used herein, a "custom brochure document" refers to a personalized document that is generated for a visitor based on interest of the visitor determined at the event.

FIG. 1 illustrates an exemplary environment in which a visitor's experience can be personalized. In the present example, a visitor 102 participates in an event 104, such as a trade show, show room, and the like. The visitor 102 registers at the entrance and a portable personal wireless device 106 (hereinafter "wireless device 106") that is capable of wireless communication is associated with the visitor 102. The visitor 102 can be given the wireless device 106 to carry as the visitor 102 navigates through the event 104 or the visitor 102 can already possess the wireless device 106, which the visitor 102 can carry into the event 104.

The wireless device 106 can be a portable device including a Radio Frequency Identification (RFID) tag, a mobile phone, a smart phone, a personal digital assistant (PDA), tablet PC, and the like, the implementation of which is well known in the art. The wireless device 106 can use one or more wireless technologies including Near Field Communication (NFC), Zigbee, Bluetooth, Institute of Electrical and Electronic Engineers (IEEE) standards 802.11(a), (b), (g), and/or (n), IEEE standard 802.16 (WiMAx), Code Division Multiple Access (CDMA), time Division Multiple Access (TDMA), and the like.

During registration, the wireless device 106 is associated with an identifier, such as a phone number or e-mail address for embodiments where the wireless device 106 is a mobile phone, smart phone, PDA, and the like, or a string of characters for embodiments where the wireless device 106 includes, for example, an RFID tag. The registration process can include entering the identifier and the association between the identifier and the visitor 102 into a computing device 108 for storage in one or more databases. For example, the name of the visitor 102 can be entered into a database and can be associated with the identifier and the wireless device 106. After the visitor 102 registers the wireless device 106, the wireless device 106 is used to identify the visitor 102 at the event 104. In some embodiments, the computing device 108 can distribute the identifier and the association between the identifier and the visitor 102 to defined wireless areas 110 at the event 104, which can each include storage to store the identifier and association. In some embodiments, the computing device 108 can provide a central database that is accessed by communication nodes in the defined wireless areas 110 to retrieve the identifier and association when the defined wireless areas 110 detect the visitor 102.

While at the event 104, the visitor 102 can move between the defined wireless areas 110. The defined wireless areas 110 can include different attractions 112, such as consumer electronic devices, commercial electronic devices, other electronic devices, and/or other exhibits, such as poster board presentations, pamphlets, brochures, and the like. In one example, the electronic devices can perform services, such as faxing, copying, scanning, printing, print finishing, and the like, which may be of interest to the visitor 102. In some embodiments, the services provided in one of the defined wireless areas 110 by the attractions 112 can be provided using peer-to-peer (P2P) standard protocols and distributed file systems Some of the attractions 112 can be electronic devices 114 with wireless communication capabilities and some of the attractions 112 can be electronic devices 116 without wireless communication capability. In some embodiments, electronic devices 116 without wireless communication capability can communicate with other electronic devices using wired communication, such as through an Ethernet cable.

Figure 2:
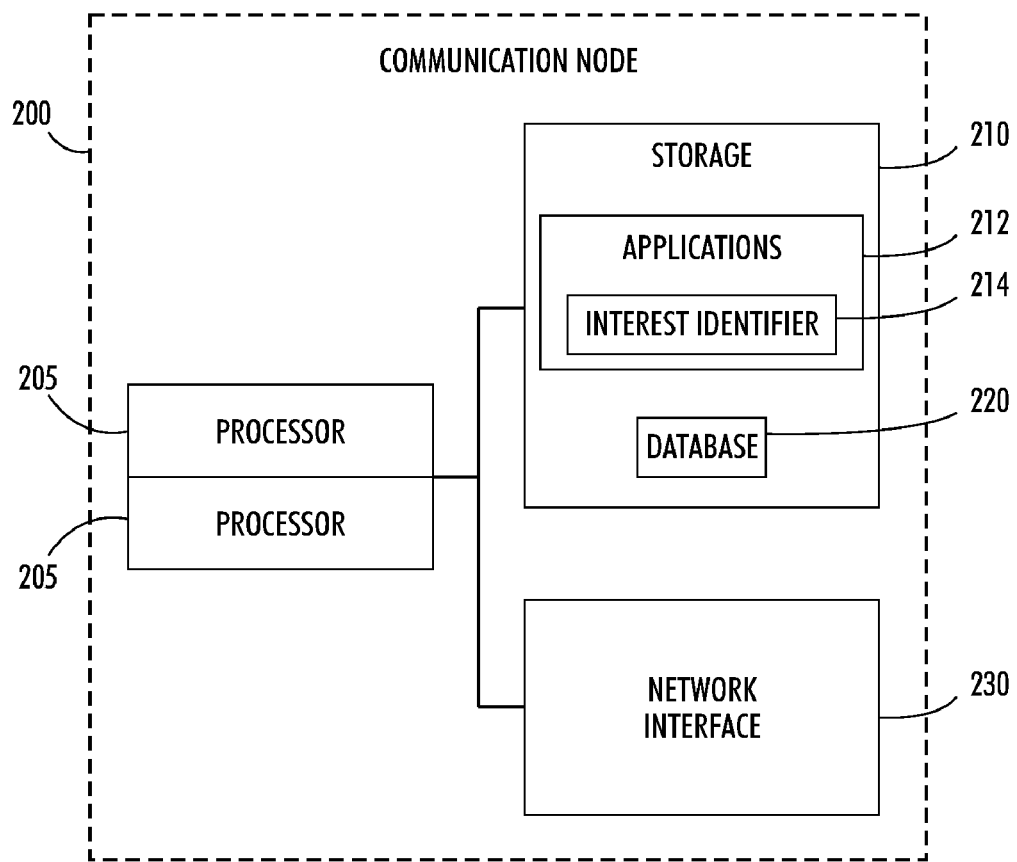
FIG. 2 is an illustrative block diagram of an exemplary communication node.

FIG. 2 illustrates an exemplary communication node 200. The communication node 200 is configured with wireless connectivity and can detect the wireless device 106 associated with the visitor 102 as the visitor 102 enters the defined wireless areas 110 (FIG. 1) based on the identifier established during registration. For example, in one embodiment, the communication node 200 can periodically broadcast a signal and when the wireless device 106 is within range the wireless device 106 can receive the signal and send a response signal verifying the presence of the wireless device 106 within one of the defined wireless areas 110. In some embodiments, the wireless device 106 can periodically transmit a signal that can be received by the communication node 200 when the wireless device 106 is within the defined wireless area corresponding to the communication node 200.

For embodiments where the defined wireless areas 110 overlap, the communication nodes 200 of the defined wireless areas 110 can communicate to determine which of the defined wireless areas 110 the visitor 102 is in. For example, the communication nodes 200 detecting the visitor 102 can determine the strength of the signal between the wireless device 106 and each of the communication nodes 200. The communication nodes 200 can correlate the strength of the signal to a distance between the wireless device 106 and the communication nodes and when one of the communication nodes 200 detects a stronger signal, the visitor 106 can be identified as being within the defined wireless area associated with the communication node that detects the stronger signal.

The communication node 200 can include one or more processors, such as central processing units (CPUs), or controllers 205 (hereinafter collectively referred to as "processors 205"), storage 210, and a network interface 230. Storage 210 can include such technologies as a floppy drive, hard drive, tape drive, Flash drive, optical drive, read only memory (ROM), random access memory (RAM), and the like. Storage 210 includes applications 212 and a database 220. Applications 212, such as an interest identifier 214, or portions thereof, can be resident in the storage 210 and can include instructions for determining interests of the visitor 102. Storage 210 can be local and/or remote to the communication node 200. The database 220 can include the identifiers that have been associated with wireless devices registered at the event 104 and can include interest information that has been determined by the interest identifier 214. The processor 205 operates to run the applications 212 in storage 210 by performing instructions therein and storing data resulting from the performed instructions, which may be stored in the database 220. The resulting data can include the interest information determined by the interest identifier 214.

The network interface 230 of the communication node 200 facilitates communication with other communication nodes, wireless devices, and attractions formed from electronic devices. Using the network interface, the communication node 200 located within the defined wireless area can transmit and receive information using wired or wireless communication. For example, the communication node 200 can use one or more wireless technologies, such as infrared (IR), Near Field Communication, Zigbee, Bluetooth, IEEE standard 802.11(a), (b), (g), and/or (n), IEEE Standard 802.16 (WiMAx), Code Division Multiple Access (CDMA), time Division Multiple Access (TDMA), GSM, and the like. The range of the communication node 200 can define the maximum boundaries of the defined wireless areas 108. For example, using NFC, the defined wireless area can typically extend about up to about 20 centimeters (cm); using Zigbee, the defined wireless area can typically extend up to about 70 meters (m); using Bluetooth, the defined wireless area can typically extend up to about 10 m; using 802.11(a), (b), (g), and/or (n), the defined wireless area can typically extend up to about 100 m; and using 802.16 (WiMAx) the defined wireless area can typically extend up to about 30 miles (mi). Typically, the boundaries of the defined wireless areas 110 can be limited to a desired range, despite the maximum boundaries available using the wireless technologies, so that the defined wireless areas do not substantially overlap.

Figure 3:
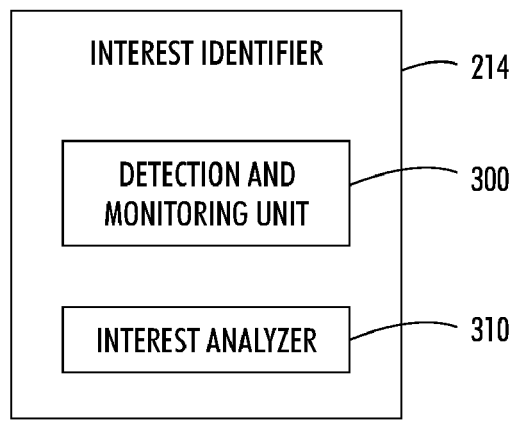
FIG. 3 is a block diagram illustrating an exemplary interest identifier that can be implemented using the communication node of FIG. 2.

FIG. 3 is a block diagram of the interest identifier 214. The interest identifier includes detection and monitoring unit 300 (hereinafter "unit 300") and an interest analyzer 310. The unit 300 can monitor the defined wireless area for the presence of the visitor 102 (FIG. 1). The unit 310 can periodically broadcast a signal and when the wireless device 106 is within range the wireless device 106 can receive the signal and send a response signal verifying the presence of the wireless device 106 within one of the defined wireless areas 110 (FIG. 1). Alternatively, or in addition, the wireless device 106 can periodically transmit a signal that can be received by the unit 300 when the wireless device 106 is within the defined wireless area corresponding to the communication node 200 so that the unit 300 can identify the visitor as being within the defined wireless area. Once the unit 300 detects the visitor 102 the unit 300 begins recording the user activities of the visitor 102, such as an amount of time the visitor 102 remains in the defined wireless area and the user interactions between the visitor 102 and the attractions 112 (FIG. 1).

The interest analyzer 310 of the interest identifier 214 can determine interest information for a visitor based on the visitor's user activities in the defined wireless area. In some embodiments, the interest analyzer can be aware of the type of attractions 112 within the defined wireless area and can be aware of the services that can be performed by the attractions 112. Using the amount of time the visitor 102 remains in the defined wireless area and the knowledge of the attractions 112 within the defined wireless area, the interest analyzer 310 can determine whether the visitor 102 is interested in the attractions 112 within the defined wireless area. Likewise, the interest analyzer 310 can use information about the user interactions to determine which of the attractions 112 and/or services provided by the attractions 112 interests the visitor 102.

Figure 4:
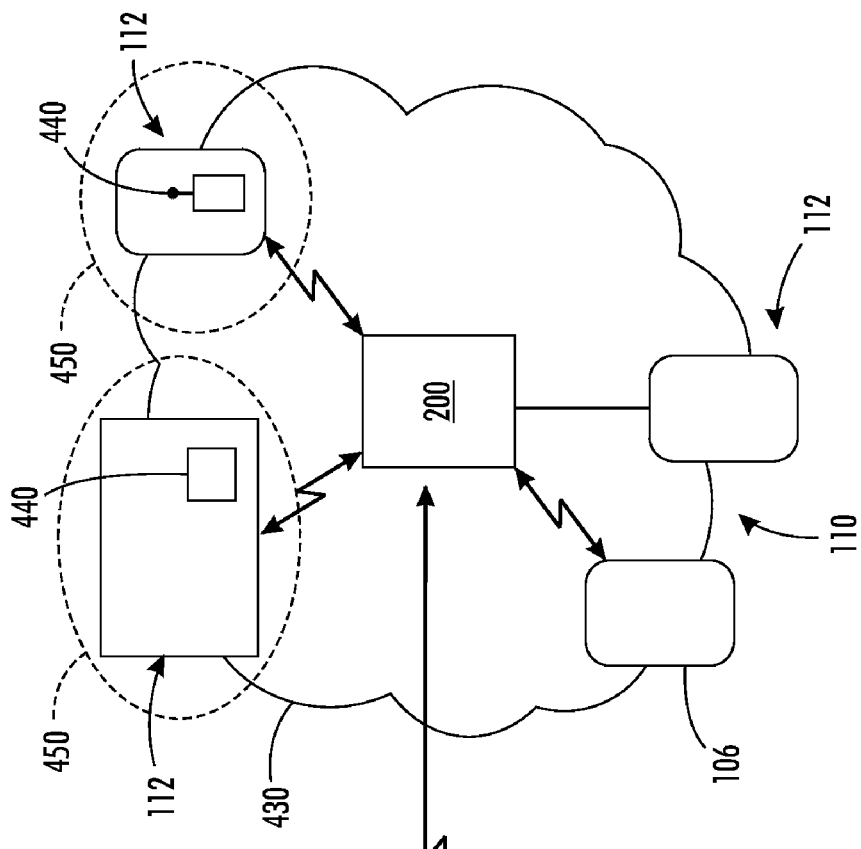
FIG. 4 illustrates exemplary defined wireless areas of FIG. 1 in more detail.
Figure 4:
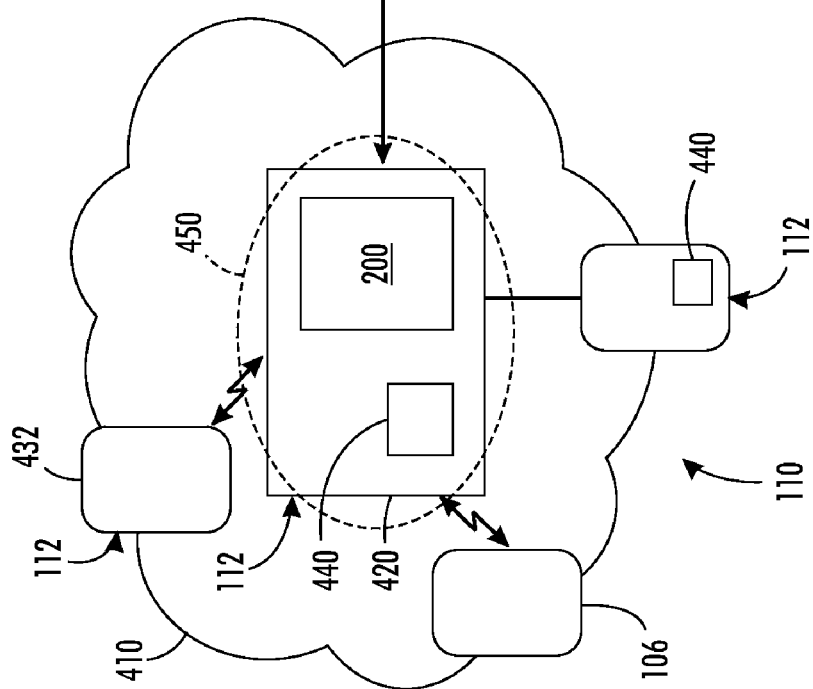

Referring to FIG. 4, each of the defined wireless areas 110 can include at least one communication node 200 configured to facilitate wireless communication with the wireless device 106 that is associated with the visitor 102 and with the computing device 108 (FIG. 1) as well as to facilitate wireless and/or wired communication between each of the defined wireless areas 110. In some embodiments, the communication node 200 can be integrated in one or more of the attractions 112, as shown in defined wireless area 410. As one example, one of the attractions 112 can be a multi-function electronic device 420, such as a device that can perform printing, scanning, and/or faxing, which can include the communication node 200. In some embodiments, the communication node 200 can be separate and distinct from the attractions 112, as shown in defined area 430, and can be in communication with one or more of the attractions 112 and the wireless device 106 as well as with other communication nodes at the event 104.

Once the communication node 200 detects that the wireless device 106 is within the defined wireless area 110, the communication node 200 begins recording user activities of the visitor 102. For example, the communication node 200 records an amount of time the visitor 102 remains in the defined wireless area 110. As the user interacts with the attractions 112, such as electronic device 432, the user interactions can be recorded by the attractions 112 and can be sent to the communication node 200 or can be directly recorded by the communication node 200.

For example, for embodiments where the communication node 200 is integrated in one of the attractions 112, the communication node 200 can directly record when the user interacts with the user interface of the attraction and for embodiments where the communication node 200 is separate and independent of the attraction, the attraction can collect the user interactions and services associated with the interactions and can send this information to the communication node 200. The information recorded by the communication node 200 (e.g., the amount of time and/or user interactions) defines user activities of the visitor 102 within one of the defined wireless areas 110, which can be used to determine interests of the visitor 102.

As one example, the defined wireless area 210 can include fax machines as the attractions 112 and based on the amount of time the visitor 102 remains in the defined wireless area 110, the communication node can determine that the visitor 102 is interested in electronic devices having faxing capabilities. In some embodiments, the amount of time the visitor 102 remains in the defined wireless area can be compared to a threshold value such that when the amount of time exceeds the threshold value, the communication node determines the visitor 102 is interested in one or more of the attractions 112 within the defined wireless area 110. In some embodiments, the amount of time can be compared to an amount of time the visitor 102 remains in the other defined wireless areas 110 that the visitor 102 previously visited. In this manner, the interests of the visitor 102 with respect to the attractions 112 can be prioritized such that the defined wireless area in which the visitor 102 remains the longest amount of time can have attractions with the highest interest priority and the defined wireless area in which the visitor 102 remains a shortest amount of time can have attractions with the lowest interest priority.

As another example, the visitor 102 can interact with one of the attractions 112 in one of the defined wireless areas 110. In the present example, one of the attractions can be a multi-function device (MFD), which can be an electronic device configured to copy, scan, fax, and the like. The visitor 102 can interact with the attraction 110 by, for example, selecting the scanning operation from a user interface of the MFD and adjusting scanning parameters associated with the scanning function. Based on this interaction, the communication node 200 can determine that the visitor 102 is interested in electronic devices capable of performing a scanning operation.

In some embodiments, the attractions 112 can include or be communicatively coupled to a visitor identifier unit 440 that can be used by the attractions 112 to distinguish the visitor 102 interacting with one of the attractions 112 from other visitors within the defined wireless area. For example, before the visitor 102 can interact with one of the attractions 112, the attraction 110 must identify the visitor 102 as the current user of the attraction 110 as opposed to simply being a visitor within the defined wireless area. To achieve this, the identifier unit 440 can include a user interface for receiving an input from the visitor 102. As one example, the visitor identifier unit 440 can include a biometric reader unit, such as a retinal scanner or a fingerprint scanner. In this case, the user's retina or fingerprint can be scanned when the user registers and the reading recorded by the biometric reader can be compared to the scanned biometric reading to identify the visitor. As another example, the visitor identifier unit 440 can include a user interface to allow the visitor 102 to enter the identifier that the visitor 102 was associated with during the registration process. For embodiments where the visitor 102 registers using the visitor's mobile phone, the identifier unit 240 can request the visitor enter the mobile phone number or e-mail address into the user interface before the visitor 102 can interact with the attraction 110.

As another example, the attractions 112 within the defined wireless areas 110 can be associated with wireless sub-areas 450 defined by the visitor identifier unit 440, which can be formed in a similar manner as described with respect to the defined wireless areas 110, but which have shorter ranges such that the defined wireless areas encompass the sub-areas 450. For example, electronic devices 420, 452, and 454 can include the identifier unit 440 that defines the wireless sub areas can extend a short distance, such as up to about 5 feet, from the attractions 112. When the visitor 102 is within the wireless sub-areas 450, it can be determined that the visitor 102 is expressing interest in a particular one of the attractions 112. This also can allow the communication node to determine that user interactions with the particular one of the attractions are being performed by the visitor 102 rather than by other visitors in the wireless defined area.

Upon determining the interests of the visitor 102 within one of the defined wireless areas 108, the communication node can further process the interests to personalize the experience of the visitor 102 at the event 104. For example, the communication node can communicate with the wireless device 106 and can send additional information to the wireless device 106, such as service available on the attraction 112 that the visitor 102 may find of interest, a Uniform Resource Locator (URL) address of a web page including information about the attractions 112, and the like. The additional information can be displayed as a message on the display of the wireless device 106. Likewise, the communication node can send the wireless device 106 suggestions regarding other attractions 112 that the visitor 102 may find interesting and can identify a location of the attractions 112 at the event 104.

In some embodiments, the communication node 200 can send the interest information to a representative, who can review the interest information and can approach the visitor 102 to provide assistance to the visitor 102. For example, when it is determined that the visitor 102 is interested in faxing operations, the representative can receive a message from the communication node 200 identifying the visitor 102 and the services (e.g., faxing operations) in which the visitor 102 is interested. Using interest information included in the message, the representative can bring brochures and/or pamphlets to the visitor 102 and/or can show the visitor 102 a more detailed operation of the services on the attraction 112 in which the visitor 102 is interested.

The interest information, as determined by the communication node 200, can be distributed to other defined wireless areas 110 at the event 104 using peer-to-peer communication. The other defined wireless areas 110 can use the interest information to control a presentation of the attractions 112 to the visitor 102 when the visitor 102 enters the other defined areas, for example, to promote services that may be available from the attractions 112. For example, after interest information has been determined for one of the defined wireless areas 110, the interest information can be sent to communication nodes 200 in other defined areas 110 so that when the visitor 102 enters the other defined wireless areas 110, the communication nodes can control which services of the attractions 112 are featured based on the interest information received. For example, the interests of the visitor 102 can be featured by displaying information about the services supported by the attractions and/or by outputting an audible message to the visitor 102 identifying services in which the visitor 102 is interested.

Figure 5:
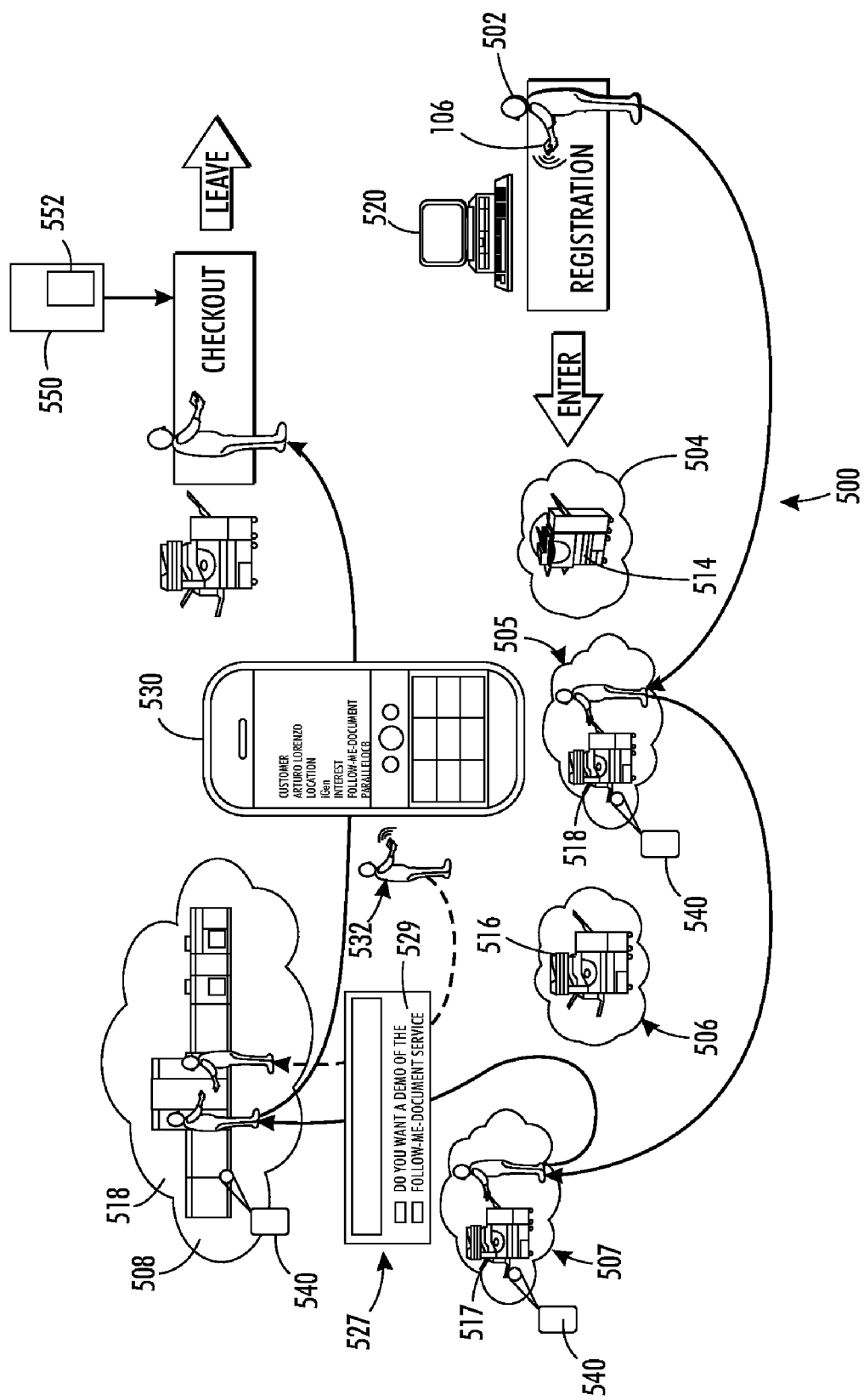
FIG. 5 shows an exemplary show room in which interests of a visitor can be determined.

FIG. 5 shows an exemplary show room 500 in which interests of a visitor 502 can be determined. The show room 500 includes defined wireless areas 504-508, which include at least one attraction. In the present example, the defined wireless area 504 includes an electronic device 514, the defined wireless area 505 includes an electronic device 515, the defined wireless area 506 includes an electronic device 516, the defined wireless area 507 includes an electronic device 517, and the defined wireless area 508 includes an electronic device 518. The defined wireless areas can be implemented as described above with reference to FIGS. 1-4.

The electronic devices 514-518 can be, for example, electronic devices configured to perform one or more document services including, for example, scanning, copying, printing, print finishing, and/or faxing, although those skilled in the art will recognize the electronic devices can take several forms including consumer electronics, commercial electronics, and the like, and can include other services or operations. The electronic devices 514-518 can communicate with the communication nodes, described with reference to FIGS. 1-4, which can be integrated in the electronic devices 514-518 or can be separate and independent from the electronic devices 514-518.

To begin, the visitor 502 enters the show room 500 and registers to associate an identifier with the wireless device 106 to be carried by the visitor 502 through the show room 500. The visitor's information including the visitor's name is entered into the computing device 520 along with the identifier that has been associated with the wireless device 106, and therefore, with the visitor 502. This information can be distributed to each of the defined wireless areas 504-508, or can be maintained centrally by the computing device 520.

After the visitor 502 registers, the visitor 502 can walk through the show room stopping at some of the electronic devices 514-518. In the present example, the visitor 502 stops at the electronic device 515 passing by electronic device 514. The visitor 502 enters the defined wireless area 505 encompassing the electronic device 515 and the communication node in the defined wireless area 505 detects the presences of the visitor 502 in the defined wireless area 505 and begins to record the amount of time the visitor 502 remains within the defined wireless area 505. As the visitor 502 interacts with the user interface of the electronic device 515, the communication node records the interactions. Using the user activity of the visitor 502, the communication node in the defined wireless area 505 can determine interests of the visitor 502 based on the amount of time the visitor 502 remains in the defined wireless area 505 and/or operations the visitor 502 selects from the user interface of the electronic device 515.

Once the communication node in the defined wireless area 505 determines the interests of the visitor 502, the communication node can distribute this information to each of the other communication nodes in the remaining defined wireless areas 504 and 506-508. Using the interest information, the electronic devices 514 and 516-518 can be configured to feature operations available on the electronic devices 514 and 516-518 that correspond to the interests of the visitor 502. For example, after stopping at the electronic device 505, the visitor 502 can continue walking through the show room and can stop at the electronic device 517 in the defined wireless area 507. Once the visitor 502 is detected within the defined wireless area 507, the defined wireless area 507 can begin recording the user activities of the visitor 502.

When the visitor 502 stops at the electronic device 517, a user interface 527 of the electronic device 517 can display a prompt 529 to the visitor 502 based on the interest information distributed by the communication node in the defined wireless area 505. For example, the visitor 502 may have selected a service available on the electronic device 505 called "Follow-Me-Document", which may have been determined as an interest of the visitor 502. As a result, the user interface 527 of the electronic device 507 displays the inquiry to the visitor 502 when the visitor 502 stops at the electronic device 507 inquiring whether the visitor 502 wishes to see a demonstration of the "Follow-Me-Document" service on the electronic device 507. As the visitor 502 continues through the show room 500, the visitor 502 may stop at the electronic device 508, at which time the communication node within the defined wireless area 518 can begin to record the user activities within the defined wireless area 518.

While the visitor 502 is walking around the show room 500, the interest information determined by the communication nodes of the defined wireless areas can be transmitted to a wireless device 530 carried by a sales representative 532. In this manner, the communication nodes can alert the sales representative 532 of visitor 502. For example, the sales representative can receive a message on a display of the wireless device 530 identifying the visitor 502, the visitor's location, the visitor's interests, and the like. Using this information, the sales representative 532 can approach the visitor 502 to offer some information about the visitor's interests and ask if the visitor 502 has any questions regarding the attractions and/or operations in which the visitor is interested.

The defined wireless areas 504-508 can include digital cameras 540 for capturing images of the visitor 502 as the visitor 502 moves through the show room 500. The cameras 540 can be positioned to capture images of the visitor 502 interacting with the electronic devices 514-518 to illustrate the electronic device in which the visitor 502 is interested. The cameras 540 can store images and/or can forward the images to a computing device 550 and/or the computing device 520, which can store the images and can use the images to create a customized brochure document.

The computing device 550 can be a mainframe, personal computer (PC), laptop computer, workstation, handheld device, such as a PDA, or the like, and can include components that are well known to those in the art including one or more processors, such as central processing units (CPUs), graphical processing units, or controllers, storage, data entry devices, such as a keyboard, mouse, and/or microphone, a display, and a network interface. The storage can include such technologies as a floppy drive, hard drive, tape drive, Flash drive, optical drive, read only memory (ROM), random access memory (RAM), and the like. Applications, such as a brochure document generator 352, which can include instructions for implementing the generation of a customized brochure document, can be implemented by the computing device 550.

Figure 6:
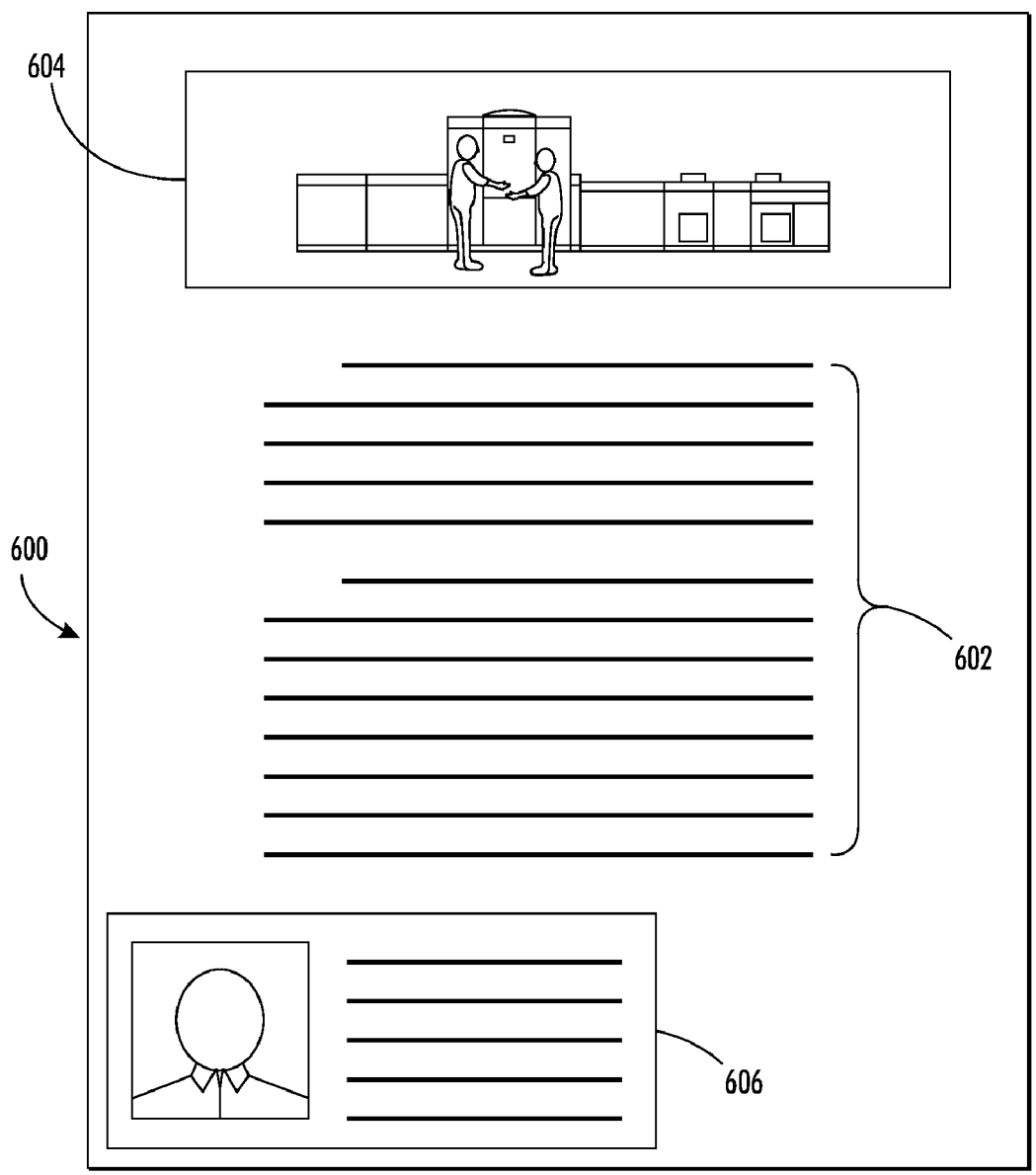
FIG. 6 illustrates an exemplary page of a custom brochure document that can be generated based on the interests of the visitor.

Using the interest information and images captured during the visit, a customized brochure document (hereinafter "document") can be generated using the brochure document generator 350. FIG. 6 illustrates an exemplary page of a custom brochure document 600 (hereinafter "document 600") that can be generated based on the interest information recorded for the visitor. For example, as the visitor 102 navigates through an event, such as the show room 300, the interest information determined by the communication nodes and images captured by the cameras can be forwarded to the brochure document generator 352.

The brochure document generator 552 can insert information 602 into the document 600 pertaining to the attractions and services in which the visitor is interested and can insert images 604 corresponding the attractions and/or services in which the visitor is interested into the document 600. The information 602 can include a description of the attractions and/or services capable of being performed by the attractions; promotions, incentives, and/or sales available with respect to the attractions; and the like. The document 600 can also include information 606 about representatives that may have assisted the visitor 102 during the visit, such as names of the representatives, contact information including a phone number and/or e-mail address of the representatives, and the like. In some embodiments, the document can include a visitor's trail showing how the visitor moved through the showroom and at which defined wireless areas the visitor stopped. In some embodiments, the brochure document generator 352 can use a document generation template that includes sections into which textual information can be entered and into which the images can be inserted.

Figure 7:
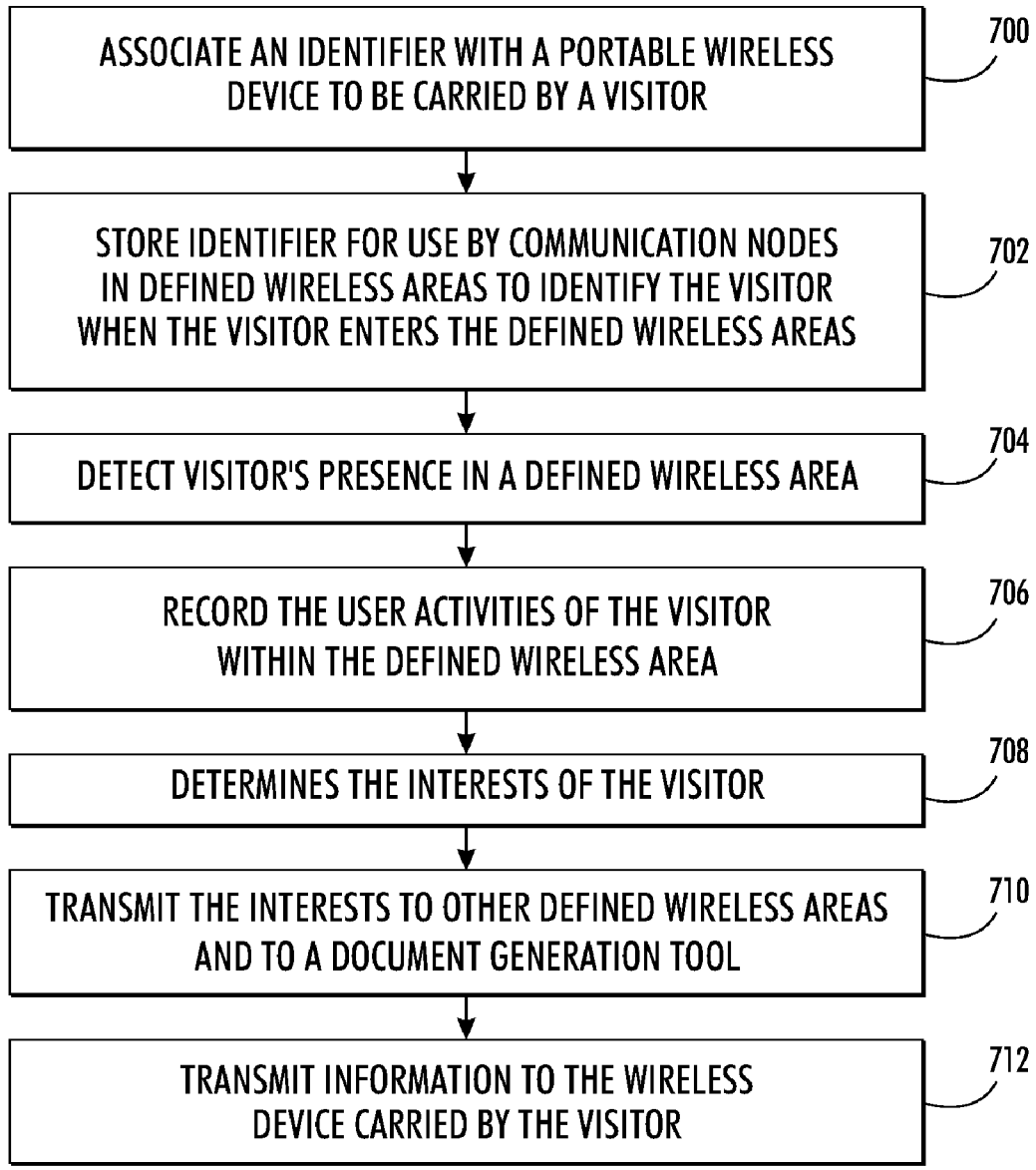
FIG. 7 is a flowchart illustrating an exemplary process for determining interests of a visitor.

FIG. 7 is a flowchart illustrating a process for determining interests of a visitor. A registration process can be performed to associate an identifier with a portable wireless device to be carried by the visitor through an event (700). The registration can include providing the visitor with a wireless portable device or using a wireless portable device already in the visitor's possession. The identifier can include a string of characters, such as a phone number or e-mail address. Once the visitor has registered, the identifier is stored for use by communication nodes in the defined wireless areas to identify the visitor when the visitor enters the defined wireless areas (702). The identifier can be stored in a central location or can be distributed to, and stored in, each of the defined wireless areas.

As the visitor moves through the event, the visitor enters one of defined wireless areas, and the presence of the visitor is detected in response to communication between the communication node and the wireless device during which the communication node retrieves the identifier from the wireless device (704). After the visitor is detected, the communication node begins recording the user activities of the visitor within the defined wireless area, such an amount of time the visitor remains within the defined wireless area and/or the interaction of the visitor with the attractions within the defined wireless area (706).

Using the recorded user activities the communication node determines the interests of the visitor (708) and transmits the interests to one or more of the other defined wireless areas and to the document generation tool (710). The communication node also transmits information to the wireless device carried by the visitor (712). The information can include additional information about the attractions and or services in which the visitor is interested, suggestions of other attractions the visitor may wish to visit at the event, and/or information about a representative the visitor can contact for more information about services in which the visitor is interested.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for personalization of event participation comprising:
   determining when a visitor enters a first one of a plurality of defined wireless areas in response to a detection of an identifier associated with a personal portable wireless device by a first communication node in the first one of the plurality of defined wireless areas, the portable wireless device being associated with the visitor;
   recording user activities of the visitor within the first one of the plurality of defined wireless areas using the first communication node; and
   determining an interest of the visitor in response to the user activities in the first one of the plurality of defined wireless areas, the interest being used to customize the event for the visitor, customizing the event for the visitor including controlling at least one electronic device in a second one of the plurality of defined wireless areas in response to the interest of the visitor determined based on the user activities recorded in the first one of the plurality of defined wireless areas.

2. The method of claim 1, wherein controlling the at least one electronic device comprises configuring the at least one electronic device within the second one of the plurality of defined wireless areas to promote a service corresponding to the interest.

3. The method of claim 2, wherein the at least one electronic device within the second one of the plurality of defined wireless areas promotes services corresponding to the interest by displaying service capabilities associated with at least one of the electronic devices that are directed to the interest of the visitor upon detection of the visitor within the second one of the plurality of defined wireless areas.

4. The method of claim 1, further comprising transmitting information associated with the interest to the personal portable wireless device, the personal portable wireless device configured to display the information to the visitor.

5. The method of claim 1, further comprising transmitting the interest to at least one wireless device associated with a representative at the event.

6. The method of claim 1, further comprising recording an image of the visitor in at least one of the defined areas in response to the detection of the identifier and based on the interest.

7. The method of claim 1, further comprising generating a custom brochure document incorporating a description of an attraction in which the visitor is interested.

8. The method of claim 1, further comprising determining the interest based on an amount of time the visitor remains in the first one of the plurality of defined wireless areas.

9. The method of claim 1, further comprising determining the interest based user interactions between the visitor and at least one electronic device within the first one of the plurality of defined wireless areas.

10. The method of claim 1, further comprising registering the personal portable wireless device to associate the portable wireless device with the visitor.

11. A system for personalizing event participation comprising:
    a plurality of communication nodes forming a plurality defined wireless areas including at least one attraction, a first one of the plurality of communication nodes being configured to determine when a visitor enters a first one of a plurality of defined wireless areas, record user activities of the visitor within the first one of the plurality of defined wireless areas, and to determine an interest of the visitor in response to the user activities in the first one of plurality of defined wireless areas, the interest being used to customize the event for the visitor,
    wherein the first one of the communication nodes is configured to transmit the interest of the visitor to a second one of the communication nodes in a second one of the plurality of defined wireless areas, the second one of the communication nodes being configured to customize the event for the visitor including responding to the interest of the visitor received from the first one of the plurality of defined wireless areas by promoting a service corresponding to the interest using at least one electronic device in the second one of the plurality of defined wireless devices.

12. The system of claim 11, wherein the at least one electronic device within the second one of the plurality of defined wireless areas promotes services corresponding to the interest by displaying service features to the visitor upon detection of the visitor within the second one of the plurality of defined wireless areas.

13. The system of claim 11, wherein one or more of the communication nodes is configured to perform at least one of transmitting information associated with the interest to a personal portable wireless device associated with the visitor, transmitting the interest to at least one wireless device associated with a representative at the event, and generating a custom brochure document incorporating a description of an attraction in which the visitor is interested in response to determining the interest.

14. A computer readable medium storing instructions executable by a computing system including at least one computing device, wherein execution of the instructions implements a method for personalization of event participation comprising:
- determining when a visitor enters a first one of a plurality of defined wireless areas in response to detection of an identifier associated with a personal portable wireless device by a first communication node in the first one of the plurality of defined wireless areas, the portable wireless device being associated with the visitor;
- recording user activities of the visitor within the first one of the plurality of defined wireless areas using the first communication node; and
- determining an interest of the visitor in response to the user activities in the first one of the plurality of defined wireless areas, the interest being used to customize the event for the visitor, customizing the event for the visitor including controlling at least one electronic device in a second one of the plurality of defined wireless areas in response to the interest of the visitor determined based on the user activities recorded in the first one of the plurality of defined wireless areas.

15. The medium of claim 14, wherein controlling the second communication node comprises configuring at least one electronic device within the second one of the plurality of defined wireless areas to promote services corresponding to the interest.

16. The medium of claim 15, wherein the at least one electronic device within the second one of the plurality of defined wireless areas promotes services corresponding to the interest by displaying service features to the visitor upon detection of the visitor within the second one of the plurality of defined wireless areas.

17. The medium of claim 14, wherein execution of the instructions implements a method further comprising at least one of transmitting information associated with the interest to the personal portable wireless device, transmitting the interest to at least one wireless device associated with representative at the event, and generating a custom brochure document incorporating a description of an attraction in which the visitor is interested.

* * * * *